Figure 1:
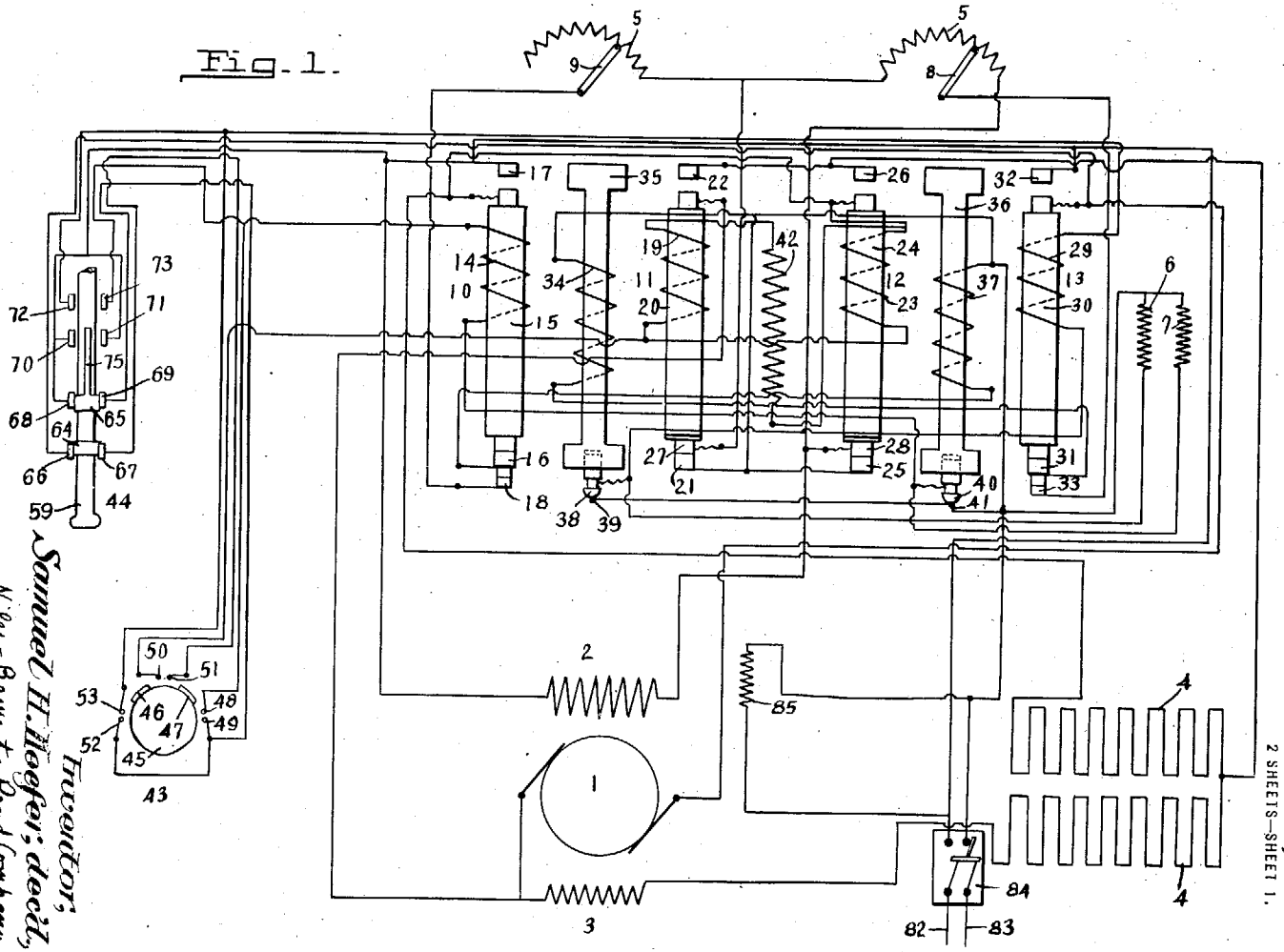

S. H. KEEFER, DEC'D.

NILES-BEMENT-POND COMPANY, ASSIGNEE.

PLANER AND SYSTEM OF MOTOR CONTROL THEREFOR.

APPLICATION FILED OCT. 19, 1916.

Reissued Oct. 22, 1918.

14,540.

2 SHEETS—SHEET 1.

Inventor;
Samuel H. Keefer; dec'd,
Niles-Bement-Pond Company
assignee,
By S. Jay Fuller
ATTORNEY S. H. KEEFER, DEC'D.
NILES-BEMENT-POND COMPANY, ASSIGNEE.
PLANER AND SYSTEM OF MOTOR CONTROL THEREFOR.
APPLICATION FILED OCT. 19, 1916.
Reissued Oct. 22, 1918.
14,540.
2 SHEETS—SHEET 2.
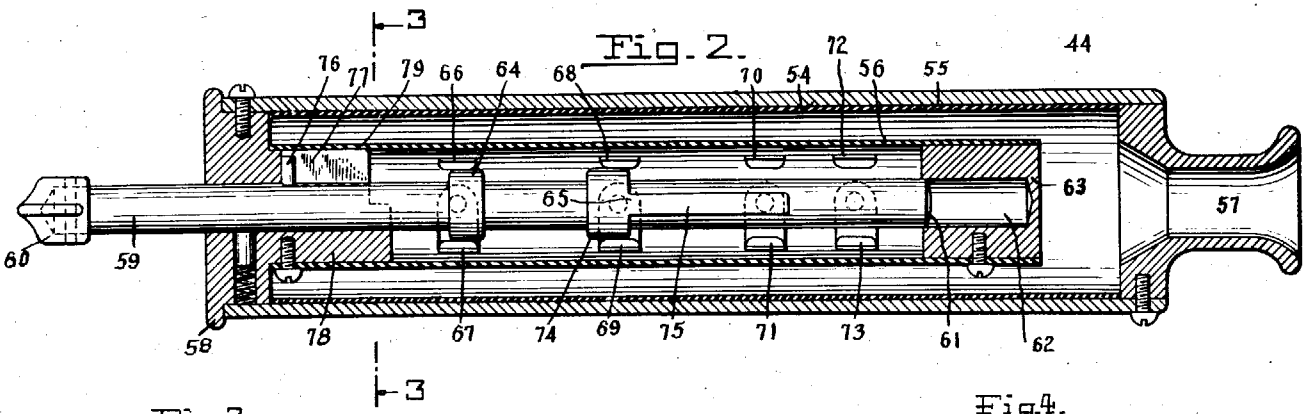
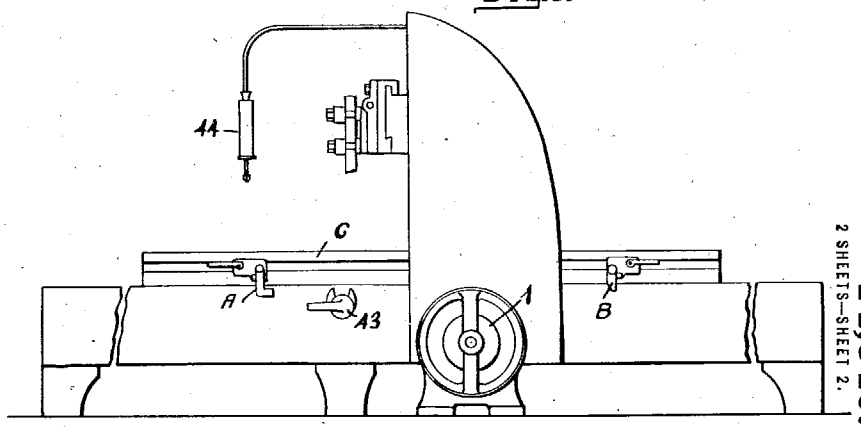
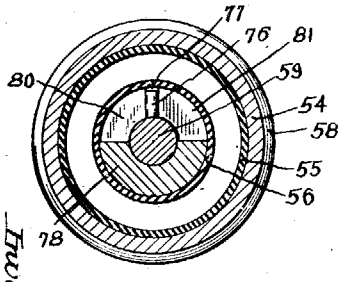
Inventor;
Samuel H. Keefer, decd.,
Niles-Bement-Pond Company
assignee.
By S. Jay Keller
ATTORNEY

UNITED STATES PATENT OFFICE.

SAMUEL H. KEEFER, DECEASED, LATE OF PLAINFIELD, NEW JERSEY, BY THE ASSIGNEE, NILES-BEMENT-POND COMPANY, OF JERSEY CITY, NEW JERSEY, A CORPORATION OF NEW JERSEY.

PLANER AND SYSTEM OF MOTOR CONTROL THEREFOR.

14,540. Specification of Reissued Letters Patent. Reissued Oct. 22, 1918.

Original No. 1,156,484, dated October 12, 1915, Serial No. 754,753, filed March 17, 1913. Application for reissue filed October 19, 1916. Serial No. 126,634.

DIVISION B.

*To all whom it may concern:*

Be it known that SAMUEL H. KEEFER, formerly a citizen of the United States, residing in Plainfield, Union county, New Jersey, but now deceased, did during his lifetime invent certain Improvements in Planers and Systems of Motor Control Therefor, of which the following is a specification.

This invention relates to a system of motor control, and with regard to certain more specific features, to apparatus designed for controlling the operation of electrically driven machine tools such as planers.

The objects of the invention are, to provide a portable device of simple construction for stopping the motor at any time from any part of the apparatus; to provide an inexpensive, simple and durable switch adapted to make one or another of several sets of connections and substantially safe against an accidental shifting of its movable member from any cause whatever; to provide means whereby the reversing, accelerating and decelerating of a motor may be readily, effectively and reliably controlled from a portable switch to the exclusion, for the time being, of the means normally controlling these operations; and to apply to a system automatically braking and reversing a motor, a switching device which may be carried to any part of the machine and there manipulated to control the operation of the entire system.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, in which are illustrated one or more of various possible embodiment of the several features of the invention, Figure 1 is a wiring diagram of a system of motor control operating in accordance with the present invention; Fig. 2 is an elevation, partly in section, of a preferred form of pendant or master switch; and Fig. 3 is a sectional view on the line 3—3, Fig. 2. Fig. 4 is a side elevation of a planer embodying the invention.

Similar reference characters refer to similar parts throughout the several views of the drawings.

Referring now to Fig. 1 of the drawings, here is represented a motor comprising the armature 1, shunt field winding 2 and interpole winding 3, the connections of these several parts being made or broken in various ways by means of the service controller hereinafter described in detail. For controlling the several operations of the motor, there is provided a body of resistance 4 adapted to be inserted at times in series with the armature 1, and two sections of resistance 5, 5, through which, at predetermined times, the current to the shunt field winding 2 flows. For governing the amount of resistance 5, 5 in circuit with the shunt field, there are provided two pivoted or otherwise movable contact devices 8, 9, of any suitable construction.

Coming now to the service controller, which makes and breaks, at the proper times, the several connections between the parts enumerated above, there are provided four solenoid switching devices 10, 11, 12 and 13, the first of which comprises a winding 14, a movable core 15, a lower contact 16 engaged by said core when the winding 14 is deënergized, and an upper contact 17 so located as to be engaged by the core 15 when said winding 14 is energized. In addition, the lower contact 16 is so supported by any suitable means that when engaged by the core 15, it is forced into engagement with an auxiliary contact 18, from which, however, the lower contact 16 frees itself when the core 15 rises. Similarly the second switch 11 comprises a winding 19, a core 20, a lower contact 21 engaged by said core when it is in its lowered position, and an upper contact 22 electrically connected with the core when the winding 19 is energized so as to lift the core from the position illustrated in the drawings. A third switch 12 has a winding 23, a core 24, a lower contact 25, and an upper contact 26 all designed to coöperate as described in connection with the first switch 11. It is, however, to be noted that the two cores 20 and 24 have, at their lower ends, contacts, respectively indicated at 27 and 28, which engage the lower contacts 21 and 25, while being insulated from the respective cores which carry them. The fourth switch 13, like the first switch 10, has a winding 29, a core 30, a lower contact 31, an upper contact 32, and an auxiliary lower contact 33, the arrangement being such that the core 30 in its lower position not only engages the contact 31, but causes the latter to engage at that time the auxiliary contact 33. When the core 30 is raised the auxiliary contact 33 is disengaged from the lower contact 31 by suitable mechanism corresponding to that used in connection with the first switch 10. The first and second switches 10 and 11 have in common a blow-out magnet comprising a winding 34 and a fixed core 35 so placed as to extinguish any arc forming between the upper or lower sets of contacts of these two switches. Similarly the third and fourth switches 12 and 13 have a common blow-out magnet comprising a fixed core 36, and a winding 37 likewise placed to extinguish arcs formed at any of the contacts of the switches 12 and 13. Movably mounted, adjacent and partly within the lower end of the fixed core 35 of the first blow-out magnet is a contact 38 adapted to coöperate in its lowered position with a fixed contact 39, there being a body of magnetic material connected to the movable contact 38 in such a way that when the winding 34 is sufficiently energized the contact 38 is drawn upward out of engagement with the fixed contact 39. Similarly the blow-out magnet core 36 has movable within it at its lower end, a body of magnetic material carrying a contact 40 normally engaging a fixed contact 41, but drawn upward away from the latter whenever the winding 37 of said magnet is sufficiently energized. It will be noted that the winding 19 of the second switch 11 has in series with it a body of resistance 42, and that the series circuit containing the winding 19 and the resistance 42 is connected in parallel with the winding 23 of the third switch 12.

For controlling the operation of the four automatic switches heretofore described, there is provided a suitable pilot switch 43 and a master switch 44, of which the first preferably comprises a rotatable drum 45 carrying two elongated contacts 46 and 47. Of these the contact 47 is designed to connect together either the contacts 48 and 49, or two other contacts 50 and 51, while the second elongated contact 46 is capable of connecting together either the two contacts 50 and 51 or the contacts 52 and 53. The master switch 44, shown more in detail in Figs. 2 and 3, comprises, in the illustrated embodiment of the invention, a pipe or cylinder 54, preferably of metal and lined with insulating material 55 and having mounted concentrically within it a tube 56, also of insulating material and spaced away from the inner wall of said cylinder as indicated in Fig. 2. One end of the cylindrical casing 54 has an outlet 57 curved to prevent injury to a cable (not shown) made up of the electrical conductors entering the same, and its opposite end is provided with a head 58 through which passes a longitudinally movable and rotatable rod 59, preferably of insulating material and having an operating handle 60 of suitable shape. The inner end 61 of this rod 59 is guided in a suitably formed recess 62 in a plug or head 63 in that end of the tube 56 adjacent the outlet 57, and it carries two contacts 64 and 65, the first of which is preferably in the form of a ring so placed as to be capable of electrically connecting two relatively fixed contacts 66 and 67 when the rod 59 is in its outer position. These two contacts 66 and 67, as well as three other pairs of contacts 68, 69, 70, 71, 72 and 73, project through the walls of the insulating tube 56 and extend for a suitable distance inside of the tube. The contact 65 comprises a ring portion 74 so located as to be capable of electrically connecting the fixed contacts 68 and 69 at the same time that the first ring 64 connects the contacts 66 and 67 and it also has a portion 75 extending longitudinally of the rod 59 so as to be capable of engaging with and electrically connecting either the contacts 71 and 73 or the contacts 70 and 72 when the rod 59 is pushed inwardly to a sufficient extent to its neutral or open-circuit position and is then rotated one way or the other through an angle of about 90°. For the purpose of guiding and limiting the movement of the rod 59, it is provided with a projecting pin 76 designed to slide within a slot 77 in a head 78 in that end of the tube 56 adjacent the head 58; the slot 77 comprising a longitudinal portion 79 and two portions 80, 81 extending in opposite directions from the inner end of the longitudinal portion 79 for about one-fourth the way around the head 78, whereby it is possible to turn the rod 59 through an angle of 90° either way from the neutral position, or to move the rod 59 longitudinally outward from said position, the respective paths of movement being guided and limited by the respective portions 80, 81, 79 of the slot 77.

Current from any suitable source of supply is delivered to the above-described system of apparatus through a pair of mains 82 and 83, Fig. 1, connected to a manually or automatically operated circuit-breaking device, illustrated conventionally at 84, and across the mains 82 and 83 on the motor side of the circuit-breaking device 84 is preferably connected a body of choking resistance 85.

In view of the clear showing of the drawings, it is considered unnecessary to describe in detail the connections between the various pieces of apparatus shown. Accordingly, the sequence of operations occurring when the pilot switch 43 and the master switch 44 are in various combinations of positions will be next considered.

Assuming that the pilot switch 43 has its movable member 45 so turned that the elongated contact 46 thereon connects the contacts 50 and 51 and the elongated contact 47 similarly connects the contacts 48 and 49, current will flow from the supply conductor 82 to the contact 68 of the master switch 44, through the contacts 65 and 69 thereof, thence through the contacts 49, 47, 48 of the pilot switch 43, winding 14 of the first switch 10, and thence through the contacts 40 and 41 to the second supply main 83. It will be noted that previous to the operation of the pilot switch 43 from its neutral or open-circuit position, illustrated in Fig. 1, the closure of the circuit-breaking device 84 permits the shunt field winding 2 of the motor to be energized, since current flows from the supply main 82 to said field winding 2, thence through contacts 28, 25 of the switch 12, and thence to the second supply main 83. As a result of the energization of the first switch winding 14, the core 15 rises into engagement with the upper contact 17 and the motor starts by virtue of the current which flows from the supply main 82 to the upper contact 17 and core 15 of the first switch, thence through all of the series armature resistance 4, interpole winding 3, motor armature 1, core 30 of the fourth switch 13, lower contact 31, winding 34 of the blow-out magnet adjacent the first and second switches 10 and 11, and thence to the second current supply main 83.

The rising of the core 15 of the first switch 10 permits current to flow from the supply main 82 through the upper contact 17 and core 15 of the first switch 10, to the windings 19 and 23 of the second and third switches 11 and 12, respectively, which windings, as before noted, are connected in parallel, and from these windings the current then flows through the pilot-switch contacts 50, 46 and 51, thence through the master switch contacts 67, 64 and 66, to the core 30 of the fourth switch 13, lower contact 31 thereof, blow-out winding 34 and so to the second supply main 83. As a consequence, the core 24 of the third switch 12 rises and shortly thereafter the core 20 of the second switch 11 is likewise drawn up into engagement with its upper contact 22, the difference in the time of action of these two switches being due to the retarding effect of the body of resistance 42 in series with the winding 19 of the second switch 11. The rising of the core 24 of the third switch 12 short-circuits a portion of the series armature resistance 4, causing the motor to speed up, and the engagement of the core 20 of the second switch 11 with its upper contact 22 causes the short-circuiting of the balance of said armature resistance 4. It is noted, however, that the rising of the core 24 of the third switch 12 separates the lower contacts 28 and 25 thereof, thus removing the short-circuit around a variable portion of the field resistance 5, so that even before the first half of the armature resistance 4 is cut out, the motor is speeded up by the weakening of its shunt field. After this first half of the armature resistance 4 has been short-circuited, the rising of the core 20 of the second switch 11 by removing the last part of the armature resistance 4 permits the direct connection of the motor armature 1 across the mains 82, 83, so that by the above-described series of operations the motor is gradually accelerated to full speed.

The moving of the member 45 of the pilot switch to its off position and then to its reversing position, in the first instance causes the short-circuiting of the motor armature and the so-called dynamic braking of the motor. The short circuit current flows from the armature through the interpole winding 3, the resistance 4, the core 15, the lower contact 16, the coil 37, the coil 34, the lower contact 31, the core 30 and back to the armature. So long as an appreciable amount of current flows in this short circuit the two contacts 38 and 40 are held elevated and out of engagement respectively with the contacts 39 and 41. So long as these contacts are separated, it is impossible to close the energizing circuit for either of the magnets 10 or 13. Preferably two high resistances 6 and 7 are connected respectively between the two contacts 38 and 39 and the two contacts 40 and 41. These resistances are such that they do not permit sufficient current to flow to energize the coils of the magnets 10 and 13, but they do serve to prevent any serious arcing between the contacts 38 and 39 and the contacts 40 and 41. After the motor speed has decreased to the desired extent, the motor is automatically started in the reverse direction, as may be noted by tracing the various circuits. For the reverse direction use is made of the magnet 13 instead of the magnet 10, but the connections are otherwise similar to those already described. If while the movable member 45 of the pilot switch 43 is in its off position (shown in Fig. 1) the movable member 59 of the master switch 44 be pushed inwardly from its outer position (shown in Fig. 1), the electrical connection between the contacts 66 and 67 as well as between the contacts 68 and 69 is broken. If the rod 59 be then rotated through an angle of 90°, the elongated portion 75 of the movable contact 65 will be brought into engagement with the fixed contacts 71 and 73, for example, with the result that current will flow from the supply main 82 to said fixed contact 71, thence through the elongated contact 75 and fixed contact 73, through the winding 14 of the first switch 10, to the second supply main 83. As a consequence, the core 15 is moved to its upper position of engagement with the upper contact 17 and current flows through the motor armature 1 as above described, although in this case there is no speeding up of the motor by reason of the cutting out of the armature resistance 4 because the circuit including the windings 19 and 23 of the accelerating switches 11 and 12 is open at the contacts 66, 67 of the pilot switch 43. It is thus possible to cause the motor to turn at its lowest speed independently of the pilot switch 43 by the above-described manipulation of the operating handle of the master switch 44, and if said handle be so turned that the elongated movable contact 74 connects the two fixed contacts 70 and 72 instead of the two fixed contacts 71 and 73, then the winding 29 of the fourth switch 13 instead of the winding 14 of the first switch 10 is energized, and current is supplied to the motor armature in a direction the reverse of that previously noted, thus causing a reversal of the direction of rotation of the motor. As before, however, the motor is necessarily operated only at its lowest speed, as the solenoids 19 and 23 of the accelerating switches 11 and 12 are open-circuited at 66, 67, as in the previous case.

It will be noted that the pilot switch 43 cannot cause the operation of the apparatus while the operating member 59 of the master switch 44 is in its inner or open circuit position, for the reason that two of the circuits controlling the reversing and accelerating switches, which pass through said pilot switch, are broken at the contacts 66, 67 and 68, 69 in the master switch.

If, while the apparatus is operating with the pilot switch 43 in either of its two "on" positions, the movable member 59 of the master switch 44 be pushed inwardly, the actuating current is cut off from the service controller, whose cores at once drop, thus causing the motor to be quickly brought to a stop by virtue of the dynamic current flowing through the short-circuited armature 1.

The above-described arrangement of apparatus is particularly adapted for use with machine tools, such as planers, and when so used the pilot switch 43 would be manipulated by hand or automatically, by means such as the dogs A and B on the reciprocating table C of a planer as shown in Fig. 4, to cause the rotation of the motor first in one direction and then in the other, suitable mechanical connections being provided between the motor and the reciprocating table of the planer so that the rotation of the motor in the two directions causes the reciprocation of the table. The master switch 44 is peculiarly well adapted to hang as a pendant at any desired part of the apparatus and to be carried at will by an operator to any part of the machine and there manipulated to stop the motor or to run it slowly in either direction regardless of the position in which the pilot switch 43 happens to be.

It will thus be clear that the several objects of the invention are secured and other advantageous ends attained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

The electrical apparatus herein disclosed, including the motor, the switches and the various connections and operating devices therefor, is not claimed in the present case except in combination with a planer or other machine comprising a reciprocating element. The electrical apparatus *per se* is made the subject matter of application Serial Number 126,633 filed on even date herewith and constituting Division A of this application for reissue.

Having described the invention, what is claimed as new and desired to be secured by Letters Patent is:

1. In a planer or other machine comprising a reciprocating table and a reversible table driving electric motor, the combination with the table and the motor, of a table operated switch serving to effect the reversal of the motor at intervals and thereby cause the table to reciprocate, and a manually operable switch supplemental to the table operated switch and adapted to effect the starting, stopping or reversal of the motor at the option of the operator.

2. In a planer or other machine comprising a reciprocating table and a reversible table driving electric motor, the combination with the table and the motor, of a table operated switch serving to effect the reversal of the motor at intervals and thereby cause the table to reciprocate, and a portable switch supplemental to the table operated switch and adapted to effect the starting, stopping or reversal of the motor at the option of the operator.

3. In a planer or other machine comprising a reciprocating table and a reversible table driving electric motor, the combination with the table and the motor, of a table operated switch serving to effect the reversal of the motor at intervals and thereby cause the table to reciprocate, means causing the motor to have different speeds in the two directions of rotation, a manually operable switch supplemental to the table operated switch and adapted to effect the starting, stopping or reversal of the motor at the option of the operator, and means for causing the motor to have a relatively slow speed in each direction when under the control of the manually operable switch.

4. In a planer or other machine comprising a reciprocating table and a reversible table driving electric motor, the combination with the table and the motor, of a table operated switch serving to effect the reversal of the motor at intervals and thereby cause the table to reciprocate, means causing the motor to have different speeds in the two directions of rotation, and a manually operable switch supplemental to the table operated switch and adapted to effect the starting, stopping or reversal of the motor at the option of the operator and to automatically cause the motor to have a relatively slow speed in each direction.

5. In a planer or other machine comprising a reciprocating table and a reversible table driving electric motor, the combination with the table and the motor, of a table operated switch serving to effect the reversal of the motor at intervals and thereby cause the table to reciprocate, a normally operative accelerating means for the motor, a manually operable switch supplemental to the table operated switch and adapted to effect the starting, stopping or reversal of the motor at the option of the operator, and means for rendering the accelerating means inoperative when the motor is under the control of the manually operable switch.

6. In a planer or other machine comprising a reciprocating table and a reversible table driving electric motor, the combination with the table and the motor, of a table operated switch serving to effect the reversal of the motor at intervals and thereby cause the table to reciprocate, a manually operable switch supplemental to the table operated switch and adapted to effect the starting, stopping or reversal of the motor at the option of the operator, and means for rendering the table operated switch inoperative when the motor is under the control of the manually operable switch.

7. In a planer or other machine comprising a reciprocating table and a reversible table driving electric motor, the combination with the table and the motor, of a table operated switch serving to effect the reversal of the motor at intervals and thereby cause the table to reciprocate, and a manually operable switch supplemental to the table operated switch and adapted to effect the starting, stopping or reversal of the motor at the option of the operator, the said supplemental switch when in use serving to render the table operated switch inoperative.

8. In a planer or other machine comprising a reciprocating table and a reversible table driving electric motor, the combination with the table and the motor, of a table operated switch serving to effect the reversal of the motor at intervals and thereby cause the table to reciprocate, means for causing the motor to have two different speeds in the two directions of rotation, a manually operable switch supplemental to the table operated switch and adapted to effect the starting, stopping or reversal of the motor at the option of the operator, means for causing the motor to have a relatively slow speed in each direction when under the control of the manually operable switch, and means for rendering the table operated switch inoperative when the motor is under the control of the manually operable switch.

9. In a planer or other machine comprising a reciprocating table and a reversible table driving electric motor, the combination with the table and the motor, of a table operated switch serving to effect the reversal of the motor at intervals and thereby cause the table to reciprocate, and a manually operable switch supplemental to the table operated switch and adapted to effect the starting, stopping or reversal of the motor at the option of the operator, the said supplemental switch when in use serving to cause the motor to have a relatively slow speed in each direction and to render the table operated switch inoperative.

10. In a planer or other machine comprising a reciprocating table and a reversible table driving electric motor, the combination with the table and the motor, of an electro-magnetic controlling mechanism, a table operated pilot switch serving to operate the controlling mechanism to effect the reversal of the motor at intervals and thereby cause the table to reciprocate, and a manually operable switch independent of the pilot switch and adapted to operate the controlling mechanism to effect the starting, stopping or reversal of the motor at the option of the operator.

11. In a controller for electric motors, in combination, reversing means, an automatically operated device associated with said means to cause periodic reversals of the motor controlled thereby, manually controlled means associated with said former means to operate the motor in either direction at will and means for disconnecting first mentioned means from said device.

12. In a controller for electric motors, in combination, electroresponsive switches adapted to cause the motor to operate in either direction, means controlling the energizing circuits of said switches to cause periodic reversals of the motor controlled by said switches and control switching means in circuit with the operating windings of said electroresponsive switches to control the same at will independently of said second mentioned means.

In testimony whereof the NILES-BEMENT-POND COMPANY causes its corporate seal to be hereto attached and its signature to be hereto affixed by its proper officer.

[L. S.] NILES-BEMENT-POND COMPANY,
By FAY INGALLS,
*Secretary.*